United States Patent
Gross et al.

(10) Patent No.: US 11,912,511 B2
(45) Date of Patent: Feb. 27, 2024

(54) GRIPPER AND TRANSPORT SYSTEM FOR A PICKING DEVICE

(71) Applicant: Becton Dickinson Rowa Germany GmbH, Kelberg (DE)

(72) Inventors: Dietmar Gross, Kelberg (DE); Stephan Brokonier, Neroth (DE); Heinrich Paul Martini, Brachtendorf (DE)

(73) Assignee: BECTON DICKINSON ROWA GERMANY GMBH, Kelberg (DE)

( * ) Notice: Subject to any disclaimer, the term of this patent is extended or adjusted under 35 U.S.C. 154(b) by 667 days.

(21) Appl. No.: 17/116,721

(22) Filed: Dec. 9, 2020

(65) Prior Publication Data
US 2022/0176572 A1   Jun. 9, 2022

(51) Int. Cl.
*B65G 47/90* (2006.01)
*B25J 9/16* (2006.01)
(Continued)

(52) U.S. Cl.
CPC ............ *B65G 47/90* (2013.01); *B25J 9/1612* (2013.01); *B25J 15/0061* (2013.01);
(Continued)

(58) Field of Classification Search
CPC .... B65G 47/90; B65G 47/905; B65G 47/907; B65G 2207/08; B25J 9/1612;
(Continued)

(56) References Cited

U.S. PATENT DOCUMENTS

| | | | |
|---|---|---|---|
| 4,543,032 A | 9/1985 | Leverett et al. | |
| 6,923,612 B2 * | 8/2005 | Hansl | B65G 1/0435 |
| | | | 414/280 |

(Continued)

FOREIGN PATENT DOCUMENTS

| | | |
|---|---|---|
| DE | 226826 A1 | 9/1985 |
| DE | 3513893 A1 | 10/1986 |

(Continued)

OTHER PUBLICATIONS

Extended European Search Report for Application No. 20212641.3, dated May 10, 2021, 15 pages including partial machine translation.

*Primary Examiner* — Thomas Randazzo
(74) *Attorney, Agent, or Firm* — Morgan, Lewis & Bockius LLP (57) ABSTRACT

A gripper for a transport system of a picking device having horizontal storage surfaces for storing and dispensing small piece goods of different shapes and/or surface properties is provided. The gripper comprises a drop table extending in first and a second horizontal directions and having a storage and dispensing end face. Two elongated gripping jaws are arranged above the drop table extending in the first horizontal direction, and are fastened to a gripping jaw guide arrangement. At least one of the gripping jaws is movable in the second horizontal direction and at least one of the gripping jaws has a gripper coupler in its end portion facing away from the gripping jaw guide arrangement, and at least one transport attachment with an attachment coupler. The gripper and attachment couplers interact so that a transport attachment is releasably fixed at an end portion of a gripping jaw.

20 Claims, 6 Drawing Sheets

(51) Int. Cl.
*B25J 15/00* (2006.01)
*B25J 15/04* (2006.01)

(52) U.S. Cl.
CPC ........ *B25J 15/0441* (2013.01); *B65G 47/905* (2013.01); *B65G 47/907* (2013.01)

(58) Field of Classification Search
CPC .......................... B25J 15/0061; B25J 15/0441; B25J 15/0213; B25J 15/026; B25J 15/0475; B25J 15/0014
See application file for complete search history.

(56) References Cited

U.S. PATENT DOCUMENTS

| | | | |
|---|---|---|---|
| 9,296,569 B2 * | 3/2016 | Hellenbrand | B65G 1/04 |
| 9,950,861 B2 * | 4/2018 | Von Liechtenstein | B65G 1/0435 |
| 10,435,252 B1 * | 10/2019 | Hellenbrand | B65G 47/90 |
| 2011/0008138 A1 * | 1/2011 | Yamashita | B65G 1/0435 414/277 |
| 2016/0200513 A1 * | 7/2016 | Hellenbrand | B65G 1/0407 414/280 |
| 2017/0066141 A1 | 3/2017 | Yokoyama et al. | |

FOREIGN PATENT DOCUMENTS

| | | |
|---|---|---|
| DE | 3705884 A1 | 9/1988 |
| DE | 102009025910 A1 | 12/2010 |
| DE | 102011010557 A1 | 8/2012 |
| EP | 1285866 A1 | 2/2003 |
| EP | 2163507 A1 | 3/2010 |
| GB | 2130550 A | 6/1984 |
| WO | WO-2019015815 A1 | 1/2019 |

* cited by examiner

GRIPPER AND TRANSPORT SYSTEM FOR A PICKING DEVICE

BACKGROUND

In modern picking devices, a large number of different types of small piece goods are stored chaotically and in a space-optimized manner on elongated horizontal storage surfaces. These storage surfaces are provided by a plurality of shelves, in which a plurality of small piece goods is stored per shelf In the case of chaotic, space-optimized storage, small piece goods, for example pharmaceutical packages and food supplement packages, are stored on storage surfaces in picking devices that are used in pharmacies or hospitals in such a way that the largest possible number of small piece goods can be stored per unit area of a storage surface. In chaotic space-optimized storage, it is rather unusual for small piece goods of the same type to be stored adjacent to one another; i.e., adjacent small piece goods regularly have different shapes and/or surface properties.

For dispensing a small piece good, it is moved from a storage surface to a drop table of the gripper. The drop table extends in a first horizontal direction (X direction) and a second horizontal direction (Y direction) which is orthogonal to the first horizontal direction, and comprises a storage and dispensing end face in the X direction. During the dispensing, a small piece good is moved onto the support table over the storage and dispensing end face; i.e., in the X direction, for example, with two elongated gripping jaws arranged above the drop table and extending in the X direction and fastened to a gripping jaw holder. For this purpose, the piece good is gripped with the two gripping jaws by moving at least one of the gripping jaws in the Y direction, whereby the small piece good is clamped with the gripping jaws. In addition, it can be provided that at least one of the gripping jaws is pivotably mounted on the gripping jaw holder, so that end portions of the gripping jaws are movable towards and away from each other, so that the small piece good is clamped over the end portions with the gripping jaws moved together at their end portions. Depending on the arrangement of a small piece good, provision can also be made for engaging with it from behind in portions. A similar procedure results when a plurality of small piece goods arranged one behind the other on a storage surface are to be dispensed.

Regardless of whether the gripping jaws are only moved together in the Y direction or at least one of the gripping jaws is pivoted, it is difficult with the known grippers to move all small piece goods equally safely, as they regularly have different shapes and surface properties that are differently well suited for the dispensing process as it is performed with known grippers having two gripping jaws. If, for example, a heavy small piece good with a very smooth surface is to be dispensed from storage, it can be difficult to move the small piece good safely even if the gripping jaws are moved together (i.e., pivoted) at their end portions before moving. Furthermore, with known grippers with two gripping jaws, it is extremely difficult or impractical to remove standing small piece goods in bottle form.

The present disclosure relates to a gripper for a transport system of a picking device having horizontal storage surfaces for storing and dispensing small piece goods of different shapes and/or surface properties, a transport system having the gripper, and a method for operating the transport system.

SUMMARY

One or more embodiments provide a gripper for a transport system of a picking device having horizontal storage surfaces for storing and dispensing small piece goods of different shapes and/or surface properties. The gripper includes a drop table extending in a first horizontal direction and a second horizontal direction orthogonal to the first horizontal direction, the drop table having at least one storage and dispensing end face. The gripper also includes two elongated gripping jaws arranged above the drop table extending in the first horizontal direction and fastened to a gripping jaw guide arrangement, wherein at least one elongated gripping jaw is movable in the second horizontal direction, and wherein at least one elongated gripping jaw has a gripper coupler at an end portion opposite the gripping jaw guide arrangement. The gripper further includes at least one transport attachment with an attachment coupler, wherein the gripper coupler and the attachment coupler interact with one another in such a way that a transport attachment is releasably fixed at the end portion of the at least one elongated gripping jaw with the gripper coupler.

One or more embodiments provide a transport system for a picking device for storing and dispensing small piece goods of various shapes or surface properties. The transport system includes a gripper that includes a drop table extending in a first horizontal direction and a second horizontal direction orthogonal to the first horizontal direction, the drop table having at least one storage and dispensing end face, two elongated gripping jaws arranged above the drop table extending in the first horizontal direction and fastened to a gripping jaw guide arrangement, wherein at least one elongated gripping jaw is movable in the second horizontal direction, and wherein at least one elongated gripping jaw has a gripper coupler at an end portion opposite the gripping jaw guide arrangement, and at least one transport attachment with an attachment coupler, wherein the gripper coupler and the attachment coupler interact with one another in such a way that a transport attachment is releasably fixed at the end portion of the at least one elongated gripping jaw with the gripper coupler. The transport system also includes a plurality of transport attachments with different contact surfaces and a storage device having a plurality of storage floors configured to receive the plurality of transport attachments.

One or more embodiments provide for operating a transport system comprising a gripper that includes a drop table extending in a first horizontal direction and a second horizontal direction orthogonal to the first horizontal direction, the drop table having at least one storage and dispensing end face, two elongated gripping jaws arranged above the drop table extending in the first horizontal direction and fastened to a gripping jaw guide arrangement, wherein at least one elongated gripping jaw is movable in the second horizontal direction, and wherein at least one elongated gripping jaw has a gripper coupler at an end portion opposite the gripping jaw guide arrangement, and at least one transport attachment with an attachment coupler, wherein the gripper coupler and the attachment coupler interact with one another in such a way that a transport attachment is releasably fixed at the end portion of the at least one elongated gripping jaw with the gripper coupler. The method comprises analyzing characteristics of a small piece good to be transported, determining which type of transport attachment of a plurality of transport attachments with different contact surfaces to use for moving the small piece good, selecting the determined transport attachment, checking whether the selected transport attachment is fixed in at least one of the gripping jaws of the gripper. When the selected transport attachment is determined not to be fixed in at least one of the gripping jaws of the gripper, the method further comprises placing a transport attachment currently fixed to a first gripping jaw on a storage floor of a storage device having a plurality of storage floors configured to receive the plurality of transport attachments, retrieving the selected transport attachment from the storage device, and fixing the selected transport attachment on the first gripping jaw.

The foregoing and other features, aspects and advantages of the disclosed embodiments will become more apparent from the following detailed description and accompanying drawings.

BRIEF DESCRIPTION OF THE DRAWINGS

In the following, one or more embodiments of a gripper, a transport system, and a method according to the disclosure shall be described with reference to the drawings, in which.

DETAILED DESCRIPTION

The detailed description set forth below describes various configurations of the subject technology and is not intended to represent the only configurations in which the subject technology may be practiced. The detailed description includes specific details for the purpose of providing a thorough understanding of the subject technology. Accordingly, dimensions are provided in regard to certain aspects as non-limiting examples. However, it will be apparent to those skilled in the art that the subject technology may be practiced without these specific details. In some instances, well-known structures and components are shown in block diagram form in order to avoid obscuring the concepts of the subject technology.

It is to be understood that the present disclosure includes examples of the subject technology and does not limit the scope of the appended claims. Various aspects of the subject technology will now be disclosed according to particular but non-limiting examples. Various embodiments described in the present disclosure may be carried out in different ways and variations, and in accordance with a desired application or implementation.

The object of the present disclosure is to provide a gripper for a transport system of a picking device with which small piece goods with different characteristics (e.g., shape, surface properties, weight) can be safely stored and dispensed.

It is also an object of the disclosure to provide a corresponding transport system and a method for operating such a transport system.

The object is achieved on the one hand by a gripper for a transport system of a picking device having horizontal storage surfaces for storing and dispensing small piece goods of different shapes and/or surface properties. The gripper according to aspects of the disclosure comprises a drop table extending in a first horizontal direction (X direction) and a second horizontal direction (Y direction) which is orthogonal to the first horizontal direction, having at least one storage and dispensing end face, two elongated gripping jaws which are arranged above the drop table and extend in the X direction and are fastened to a gripping jaw holder, wherein at least one of the gripping jaws is movable in the Y direction and wherein at least one of the gripping jaws has a gripper coupling means at its end portion facing away from the gripping jaw holder. The gripper further comprises at least one transport attachment with an attachment coupling means, wherein the gripper coupling means and the attachment coupling means interact with one another in such a way that a transport attachment is releasably fixed at an end portion of a gripping jaw.

By providing the two interacting coupling means, the gripper is able to use a plurality of different transport attachments, wherein the different transport attachments are geared to different dispensing scenarios. For example, it is conceivable in the case of a transport attachment (or a pair of transport attachments, provided that both gripping jaws include a gripper coupling means) to provide the contact surface(s) of the transport attachment(s) with a circular segment-shaped recess, so that, when the gripping jaws move together with the appropriately adjusted transport attachments, a small piece good in the form of a standing bottle can ideally be gripped. In some aspects of the disclosure, it is conceivable to provide transport attachments that have very large contact surfaces in case of particularly sensitive small piece goods, so that damage to a small piece good can be avoided. In addition, it is conceivable to provide transport attachments with a contact surface on which a plurality of, for example, rubber-like extensions are provided which increase the adhesive friction between the small piece good and the transport attachment.

Since coupling means are provided on the gripping jaws themselves as well as on transport attachments in the gripper according to aspects of the disclosure, it is therefore possible to adjust the gripper specifically to "problematic" small piece goods so that it is possible with the gripper to also securely move such small piece goods, for example, from a storage surface to the drop table, where such small piece goods cannot be dispensed with a conventional gripper which cannot be specially adjusted to the small piece goods or which can be adjusted only with a large error rate or causes damage to the small piece good.

The subject technology can be used with grippers that store and dispense the small piece goods via only one storage and dispensing end face, but also with those which drop table has two storage and dispensing end faces.

How exactly the gripper and attachment coupling means are designed depends on the planned applications of the picking device. For example, it is conceivable that a gripper coupling means is designed as a projection that is retractable and extendable and the attachment coupling means is designed as a corresponding recess in a transport attachment. A corresponding design of the coupling means is structurally quite simple and requires little additional effort in the manufacture of the gripper.

In this context, it can also be provided that a gripper coupling means is designed as a movable projection and is mechanically preloaded in such a way that it engages in an attachment coupling means of a transport attachment designed as a recess without the action of a counterforce. Here, no additional active means for releasing and establishing an interaction between the coupling means have to be provided, as long as it is ensured that the transport attachment is fixed accordingly when releasing/establishing the interaction.

In some aspects of the disclosure, a projection that is retractable and extendable can be designed to be movable with a drive arranged in the gripper. It is true that this entails additional structural effort for the gripper, but a storage device for transport attachments does not have to provide any means for releasing/producing an interaction. This can be particularly useful when such a storage device is simply positioned on any storage surface.

In some aspects of the disclosure, it can be provided that a gripper coupling means is designed as an electromagnet and the attachment coupling means is designed as an at least partially ferromagnetic counter-means. Here, a further component is to be provided in the end portion of a gripping jaw, but this is not a mechanical component and therefore only requires very limited maintenance.

In some aspects of the disclosure, a gripper coupling means can be designed as a chuck means and an attachment coupling means can be designed as a corresponding receiving opening for the chuck means. In some aspects of the disclosure, a gripper coupling means is designed as a gripping means and an attachment coupling means is designed as a corresponding anchor for the gripping means.

The object is also achieved by a transport system for a picking device for storing and dispensing small piece goods of different shapes and/or surface properties. The transport system according to aspects of the disclosure comprises the gripper described above, a storage device for a plurality of transport attachments, the storage device having a plurality of storage locations for these transport attachments, and a plurality of transport attachments with different contact surfaces. By combining a gripper according to the disclosure with a storage device in which a plurality of different transport attachments can be provided, it is possible to use the transport system according to the disclosure to store and dispense a plurality of different small piece goods of different shapes and/or surface properties or different weights. By providing the possibility that the gripper is adjusted to the small piece good to be dispensed, namely by attaching one or two coordinated transport attachment(s), the transport system according to the disclosure can also be used to move small piece goods, that are difficult to move, cannot be transported or moved at all, or can only be transported or moved with a considerable risk of damage with a conventional gripper.

As already explained above, there is a plurality of possibilities for how precisely the gripper coupling means and the attachment coupling means are designed and interact. In a preferred embodiment of the transport system according to the disclosure, it is provided that the storage device has means for releasing an interaction between the gripper coupling means and the attachment coupling means. In such a case, it is not necessary to resolve the aforementioned interaction via the gripper itself, so that fewer components have to be provided in the gripper or the gripping jaws of the gripper. Rather, the release of the interaction takes place in the storage device. How exactly this release of the interaction is carried out depends on how the gripper coupling means and attachment coupling means are designed. For example, it is conceivable that the storage device has an extendable nose which engages in a recess of the attachment and the gripping jaw and with which the gripper coupling means can be moved vertically, for example. However, the precise configuration of the means provided for releasing the interaction in the storage device is not substantial for the disclosure.

In some aspects of the disclosure, the object is achieved by a method for operating the above-described transport system. According to the disclosure, the characteristics of a small piece good to be transported (for example shape, surface properties, or weight) are first analyzed to determine which type(s) of transport attachment(s) of the transport system is/are best suited for moving the small piece good. It is then checked whether such a target transport attachment is fixed in at least one of the gripping jaws of the gripper. If this is not the case, at least one actual transport attachment currently fixed to a gripping jaw is placed on a storage place of the storage device, and at least one target transport attachment suitable for moving the small piece good is fixed on a gripping jaw.

How exactly it is analyzed which transport attachment is best suited for moving a small piece good to be moved depends on which transport attachments are included in the transport system. Furthermore, it is important which characteristics of a small piece good to be transported are known and can therefore be used for the analysis. If, for example, the shape, weight and surface properties are known, different value ranges of the three aforementioned parameters can be assigned to each transport attachment of the transport system, and that transport attachment is used for transporting a small piece good, the parameter ranges of which correspond most closely to the parameters of a small piece good to be transported.

An unsuitable transport attachment can be set down in the storage device by canceling the interaction between the gripper coupling means and attachment coupling means via the gripper or via the storage device. As soon as this interaction is canceled, the end portions of the now free gripping jaws can be moved to the transport attachment(s) that was/were selected as the most suitable during the analysis. As soon as the gripping jaws are in position, the interaction is restored, specifically via means of the gripper or the gripping jaws or the storage device. It is true that changing the transport attachments takes a specific amount of time, but when using the system according to the disclosure, it is possible, if necessary, to also move small piece goods, that simply cannot be moved with conventional grippers, i.e. those that always have the same structure at the end regions of the gripping jaws. The flexibility with regard to the storage of different small piece goods can thus be increased considerably compared to known picking devices.

Picking devices already in operation can easily be adjusted to the new transport system and the method according to the disclosure by fixing the storage device on an existing storage surface and modifying the gripping jaws of the gripper. Depending on the exact design of the gripper and the storage device, only minor structural changes need to be made to the gripper.

Figure 1:
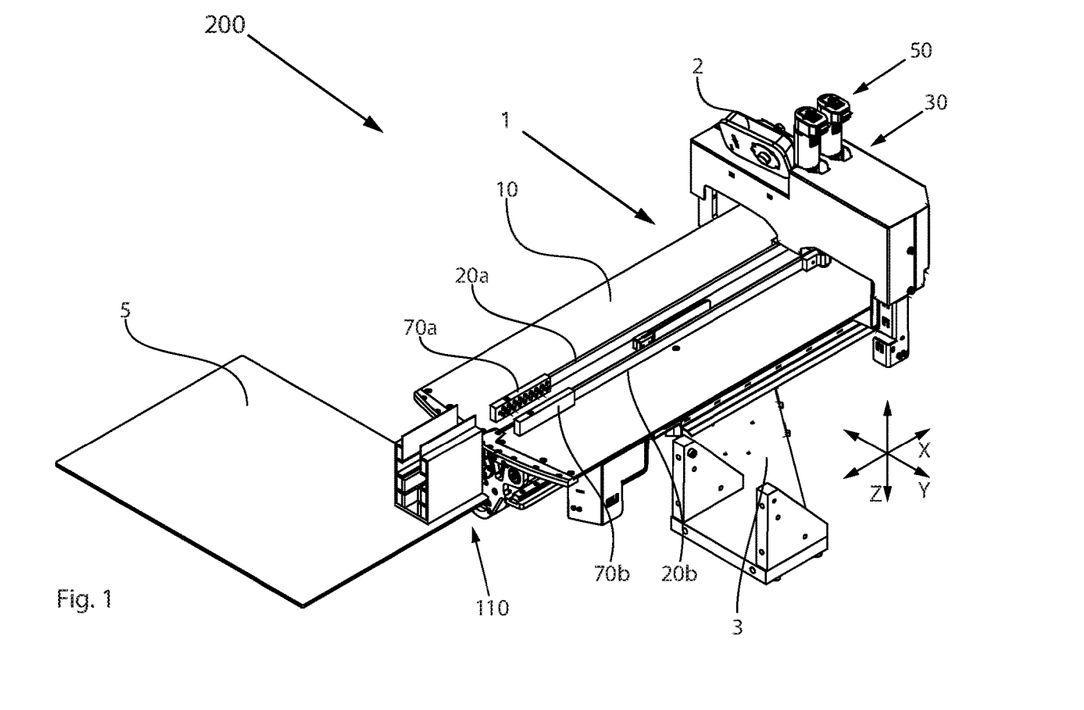
FIG. 1 is perspective view of a transport system, according to aspects of the disclosure.

FIG. 1 is an oblique view of one or more embodiments of a transport system 200 according to the disclosure. This transport system 200 includes a gripper 1 and a storage device 110, which is arranged on a storage surface 5 that is otherwise used for storing small piece goods. The gripper 1 comprises a drop table 10 extending in the X and Y directions as well as two gripping jaws 20a, 20b extending in the X direction, each of which comprises a transport attachment 70a, 70b at its end portions. The gripping jaws 20a, 20b themselves are fastened to a gripping jaw guide arrangement 30, which is described in more detail in subsequent drawings. A sensor 2 is arranged on the gripping jaw guide arrangement 30, with which different aspects of a storage and dispensing process can be monitored. Furthermore, a drive unit 50 is arranged on the gripping jaw guide arrangement 30, which is also described in more detail in the following figures. The gripper 1 is fastened via a pivoting arm 3 to a guide device (not shown) with which the gripper 1 can be moved through a picking device in the Y and Z directions.

Figure 2A:
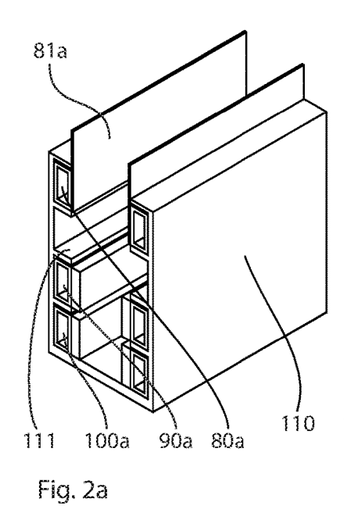
FIGS. 2a, 2b and 2c are detailed views of storage devices and transport attachments of the transport system of FIG. 1, according to aspects of the disclosure.
Figure 2B:
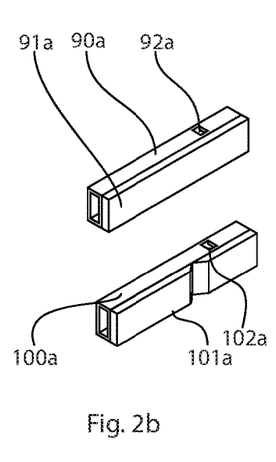
Figure 2C:
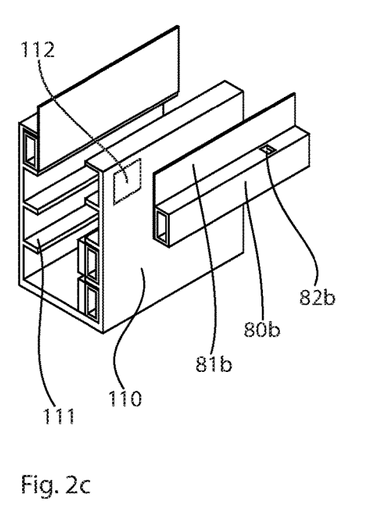

FIGS. 2a-2c show detailed views of the storage device 110 and of various transport attachments 80a, 90a, 100a, 80b. The storage device 110 is a type of simple "high storage" in which a plurality of storage floors 111 are provided in pairs at different positions in the Z direction. For the 90 shown in FIG. 2a, four pairs of different transport attachments 80a, 90a, 100a can be stored. Transport attachment 80a includes a contact surface 81a.

FIG. 2b shows two different transport attachments 90a, 100a, which can be fixed on the end region of the gripping jaw 20a. The transport attachments 90a, 100a shown in FIG. 2b comprise an attachment coupler 92a, 102a, which in both transport attachments 90a, 100a is designed as a simple recess in the top of the transport attachment 90a, 100a. Each of the two transport attachments 90a, 100a comprises a contact surface 91a, 101a, the contact surface 101a of the transport attachment 100a having a notch. Such a contact surface 101a can be used, for example, if a corresponding projection is provided on the outside of the piece good to be removed, which projection comes into contact with the transport attachment 100a.

In aspects of the disclosure, the storage device 110 shown in FIG. 2c includes an interaction member 112 for releasing/establishing an interaction between a gripper coupler 124, 134, 144, 154, 164 (FIGS. 7a-7e) and an attachment coupler 122, 132, 142, 152, 162 (FIGS. 7a-7e). How exactly the gripper coupler 124, 134, 144, 154, 164 is constructed and how the interaction between the gripper coupler 124, 134, 144, 154, 164 and the attachment coupler 122, 132, 142, 152, 162 is released or established depends on how precisely the gripper coupler 124, 134, 144, 154, 164 and the attachment coupler 122, 132, 142, 152, 162 are designed. For example, it is conceivable (but not shown) that the means for releasing the interaction has an extendable nose which engages in a recess of the transport attachment 100a and the gripping jaw 20a, 20b and the gripper coupler 124, 134, 144, 154, 164, which in this case would also have to be designed as a movable nose, moved in the Z axis to release and, if necessary, restore an interaction. In some aspects of the disclosure as shown in FIG. 2c, a transport attachment 80b is illustrated, in which the attachment coupler 82b is again designed as a simple recess. In this transport attachment 80b, a contact surface 81b has a particularly large surface design in order to ensure particularly gentle transport of a small piece good.

The exact design of the contact surface 81b, 91a, 101a depends on the type of small piece goods to be moved. The greater the number of different types of small piece goods, the greater the number of different transport attachments 80a, 90a, 100a, 80b should be. The size of the storage device 110 must also be adjusted accordingly. In some aspects of the disclosure, a plurality of storage devices 110 can also be provided on a storage surface 5.

Figure 3A:
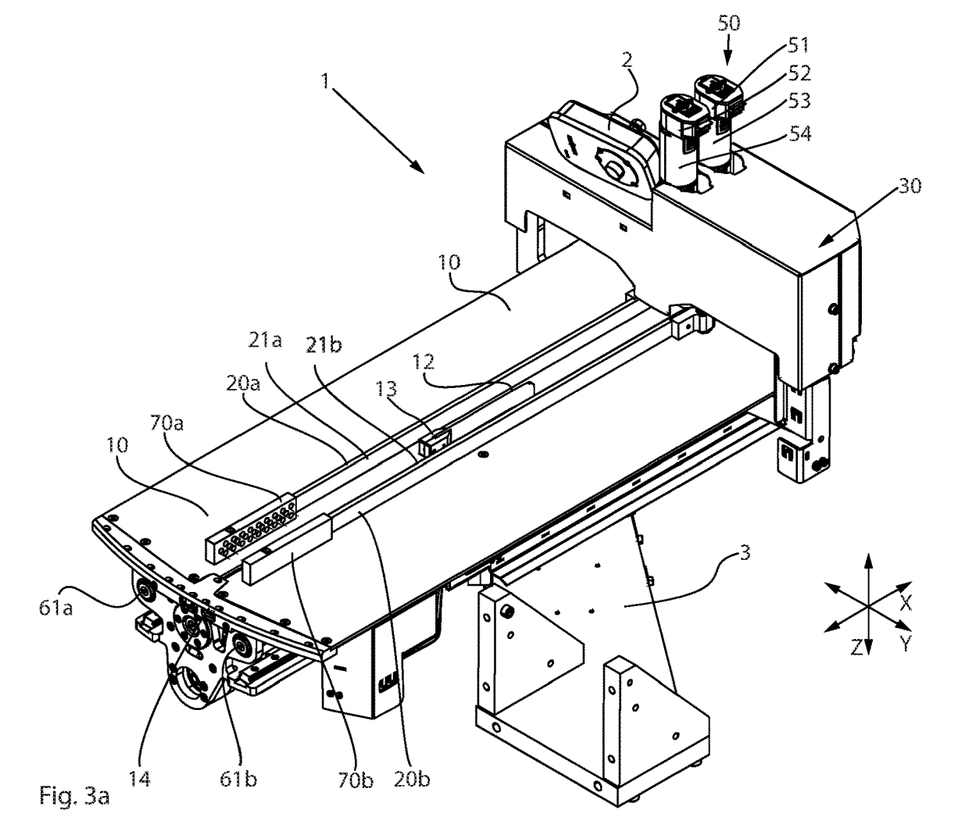
FIGS. 3a and 3b are perspective views of a gripper of the transport system of FIG. 1, according to aspects of the disclosure.
Figure 3B:
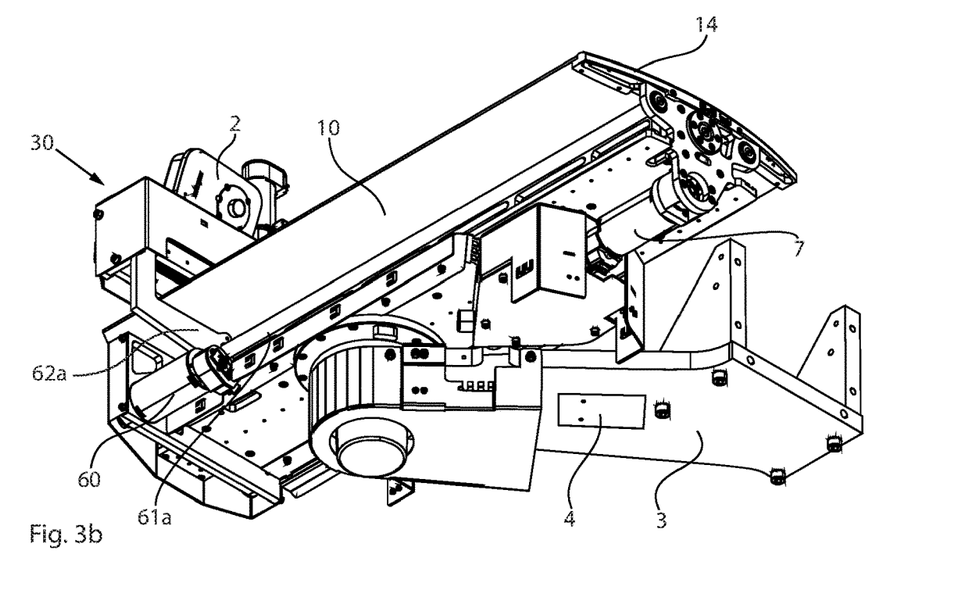

FIGS. 3a and 3b show two oblique views of the gripper 1 according to aspects of the disclosure, wherein FIG. 3a shows an oblique view from above and FIG. 3b shows an oblique view from below. The gripper 1 is part of an operating device (not shown) for a picking device and comprises a drop table 10 and two gripping jaws 20a, 20b with opposing gripping surfaces 21a, 21b. At their free ends, the gripping jaws 20a, 20b of the gripper 1 in this case each have a transport attachment 70a or 70b. At the free ends of the gripping jaws 20a, 20b, the drop table 10 has a storage and dispensing end face 14.

The drop table 10 comprises an elongated opening in the middle, which extends in the storage and dispensing direction, i.e., in the first horizontal direction X. A sliding element 12 having a widened sliding head 13 is arranged in the opening. The sliding element 12 can be moved in the elongated opening in the first horizontal direction X.

A gripping jaw guide arrangement 30, with which the gripping jaws 20a, 20b are connected and which includes a mechanism for moving and pivoting the gripping jaws 20a, 20b, is arranged opposite the storage and dispensing end face 14. In the upper portion, the gripping jaw guide arrangement 30 comprises a drive unit 50 having two drives 51, 52 and associated gears 53, 54. The gripping jaws 20a, 20b are moved and pivoted via these two drives 51, 52, as will be described in more detail with reference to the following figures. An optical detection device 2 is arranged on the gripping jaw guide arrangement 30, with which various aspects can be monitored during the storage and dispensing process.

The gripping jaw guide arrangement 30 and all of its electronic components are connected to a control device 4 that is arranged below a fastening arm 3. The fastening arm 3 itself is fastened to the drop table 10 or to a substructure of the drop table 10 via a rotary joint.

For the storage and dispensing of small piece goods, the gripping jaw guide arrangement 30 must be moved in the first horizontal direction X (e.g., storage and dispensing direction). For this purpose, according to aspects of the disclosure, a drive 60 is arranged below the drop table 10. This is coupled via a gear to a linear drive 61a, 62a, by which the gripping jaw guide arrangement 30 is moved in the first horizontal direction X. A drive 7, which drives the sliding element 12, is also arranged under the drop table 10.

Figure 4A:
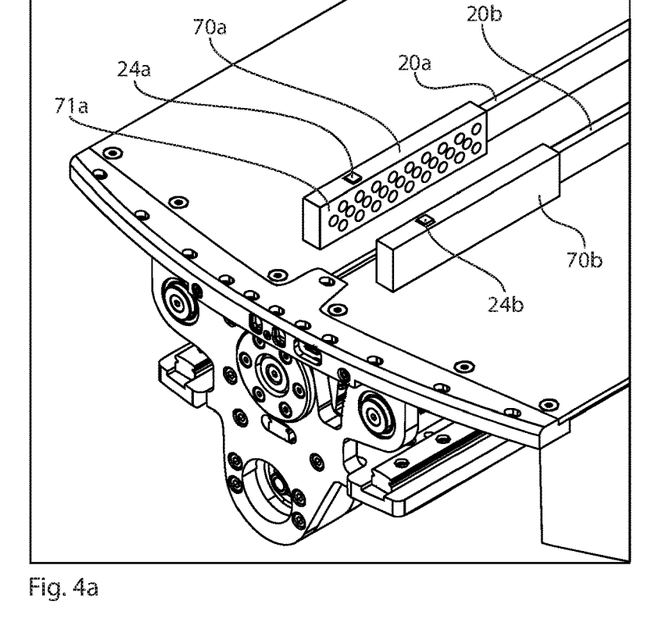
FIGS. 4a and 4b show detailed views of an end face of the gripper of FIGS. 3a and 3b, according to aspects of the disclosure.
Figure 4B:
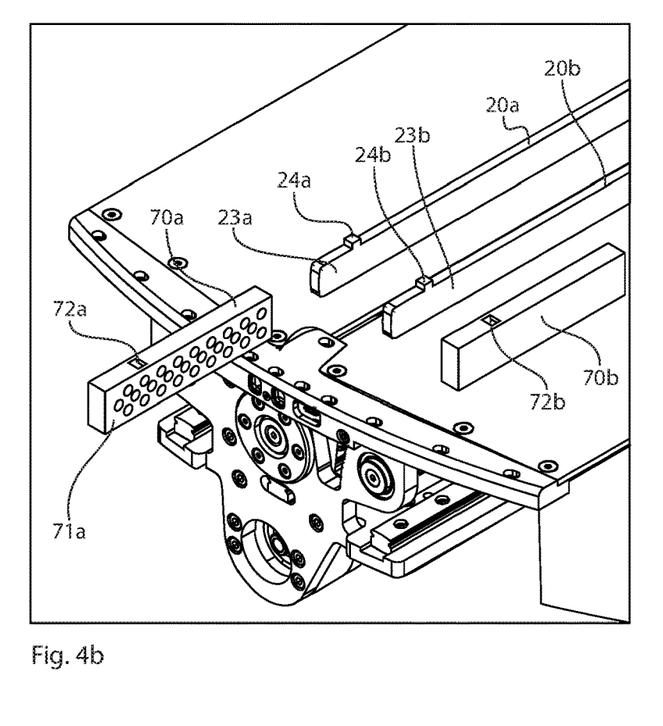

FIGS. 4a and 4b are detailed views of the gripper 1, according to aspects of the disclosure, in the region of the storage and dispensing end face 14. In FIGS. 4a and 4b, it can be seen in more detail how the transport attachments 70a, 70b can be arranged at end portions 23a, 23b of the gripping jaws 20a, 20b. The transport attachments 70a, 70b each comprise a contact surface (only 71a shown) that have a plurality of projections that increase the adhesive friction between the transport attachment 70a, 70b, and thus the gripping jaw 20a, 20b, and the small piece good. In this variant of the transport attachments 70a, 70b, too, the attachment coupler 72a, 72b is designed as a simple recess in the top of the transport attachment 70a, 70b. The gripper coupler 24a, 24b is designed as a simple retractable and extendable projection. Whether the interaction between the gripper coupler 24a, 24b and the attachment coupler 72a, 72b is released via the gripping jaws 20a, 20b or a storage device 110 is not explained in greater detail in FIGS. 4a and 4b. In FIGS. 4a, 4b, however, it can be seen in particular that the transport attachments 70a, 70b shown in FIGS. 4a and 4b (and all previous drawings) completely encompass the end regions 23a, 23b of the gripping jaws.

However, such a configuration of the transport attachments 70a, 70b is not absolutely necessary. It is substantial that the transport attachments 70a, 70b can be releasably fixed at the end regions 23a, 23b of the gripping jaws 20a, 20b via the combination of gripper coupler 24a, 24b and attachment coupler 92a, 102a. Alternatively, it would also be conceivable that, for example, on the rear side of the contact surface 71a, attachment contact means are provided in the form of a ferromagnetic means, which interact with a gripper coupler 24a, 24b in the form of an electromagnet. From the foregoing, it is clear that the choice of the term "transport attachment" is not intended to suggest that it necessarily rests or lies on a portion of the end regions 23a, 23b of a gripping jaw 20a, 20b.

Figures 5, 6A:
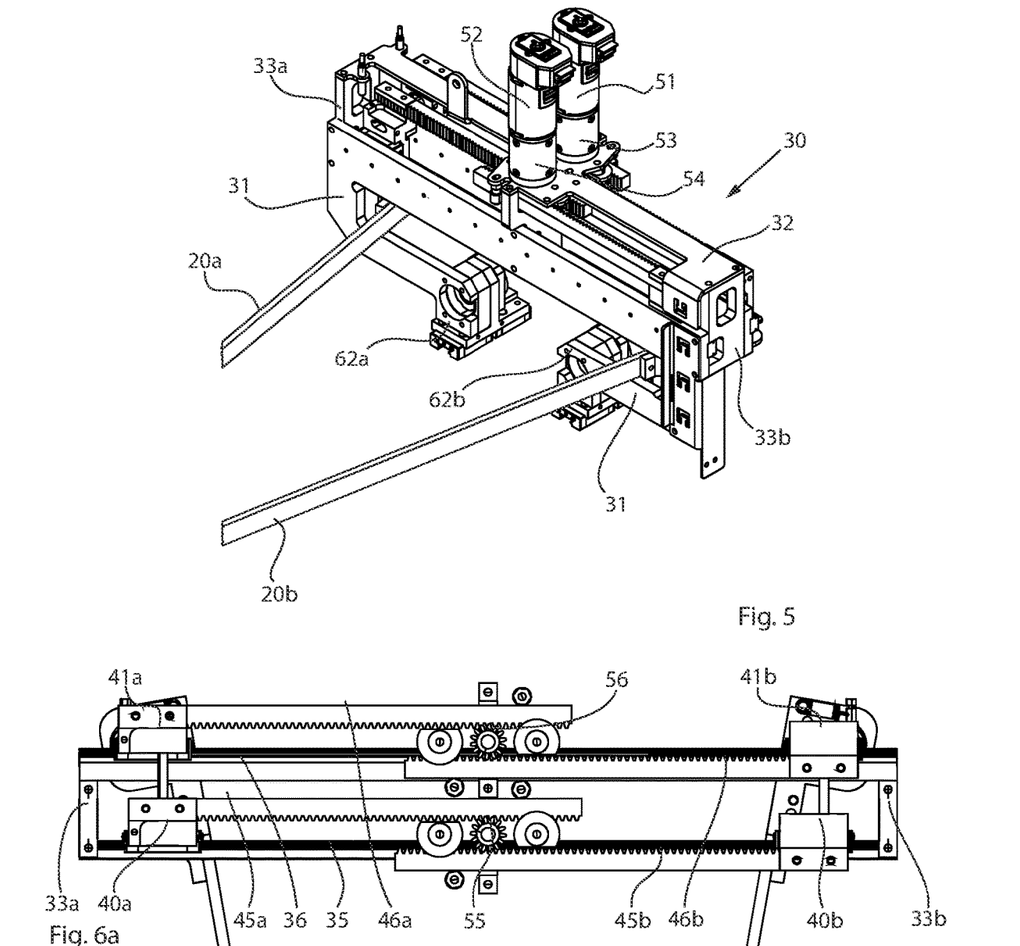
FIG. 5 is a perspective view of a movement mechanism of the transport system of FIG. 1, according to aspects of the disclosure.
FIGS. 6a and 6b are top and bottom views of the movement mechanism of FIG. 5, according to aspects of the disclosure.

FIG. 5 is an oblique view of the gripping jaw guide arrangement 30 of the gripper 1, in which both gripping jaws 20a, 20b are pivoted for gripping. The gripping jaw guide arrangement 30 comprises a frame structure 31, 32, 33a, 33b, the front component 31 engaging around the gripping jaws 20a, 20b and the drop table 10 (not shown). At the lower ends of the front component 31, movable parts 62a, 62b (the "runners") of a linear drive are fastened, with which the gripping jaw guide arrangement 30 can be moved in the first horizontal direction X. The movable parts 62a, 62b are said to be "movable" because they move along with the gripping jaw guide arrangement 30 along corresponding fixed parts 61a, 61b (FIGS. 3a, 3b), which are rotated to move the moving parts movable parts 62a, 62b in the first horizontal direction X. The fixed parts 61a, 61b themselves can also move to move the movable parts 62a, 62b, for example by rotating, wherein the movable parts 62a, 62b are moved along the longitudinal axis of the fixed parts 61a, 61b during this rotary movement, but any immovable parts are stationary based on the position in the gripper 1. In some aspects of the disclosure, it is conceivable, for example, that the stationary parts are designed as toothed belts which are designed between the longitudinal ends of the gripper 1 and interact with corresponding deflection rollers for moving the movable parts 62a, 62b.

As can be seen from FIG. 6a, two guides, a first guide 35 and a second guide 36, extend between the side frame structure components 33a, 33b in a second horizontal direction Y parallel to one another and in the first horizontal direction X spaced apart from one another, wherein the first guide 35 faces the free ends of the gripping jaws 20a, 20b. Two gripping jaw slides 40a, 40b; 41a, 41b are arranged on each of the guides 35, 36; two first gripping jaw slides 40a, 40b on the first guide 35, two second gripping jaw slides 41a, 41b on the second guide 36. In some aspects of the disclosure, a portion of the gripping jaw slide 40a, 40b; 41a, 41b engages around a projection of the guides 35, 36 so that the gripping jaw slides 40a, 40b; 41a, 41b partially rest on this projection.

Figure 6B:
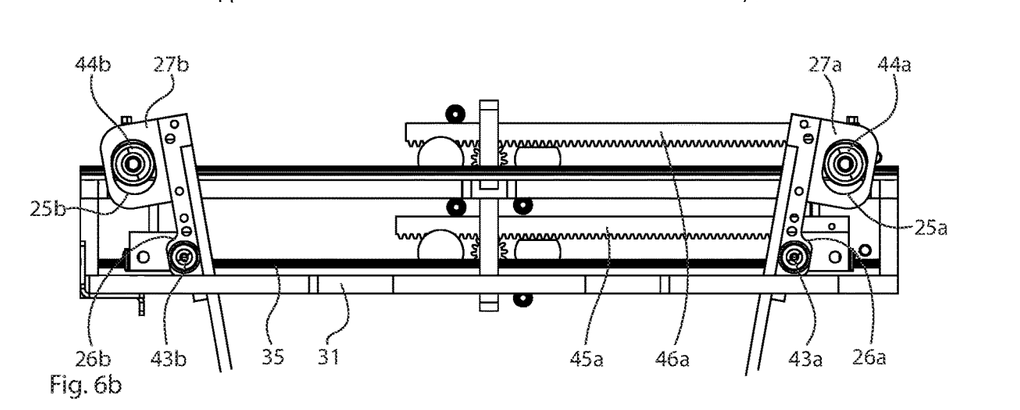

In FIGS. 6a and 6b, it can be seen that the gripping jaw slides 40a, 40b; 41a, 41b are provided with drive elements 45a, 45b; 46a, 46b, which may be designed as toothed racks. The drive elements 45a, 45b assigned to the first guide 35 or the corresponding first gripping jaw slide 40a, 40b and the corresponding drive elements 46a, 46b assigned to the second guide 36 are oriented with respect to the toothed elements of the toothed racks in such a way that the toothed elements lie opposite one another and the free ends thereof form an overlap region. A drive gear 55, 56 is arranged in the center in the overlap region of the drive elements 45a, 45b; 46a, 46b (e.g., toothed racks), which drive gear 55, 56 is coupled to a drive 51, 52 via a gear 53, 54 (not shown in FIGS. 6a and 6b). The distance between the gripping jaw slides 40a, 40b; 41a, 41b of a guide and the corresponding drive gear 55, 56 is identical. A drive gear 55, 56 is therefore arranged exactly in the middle between two gripping jaw slides 40a, 40b; 41a, 41b, so that a movement of the drive gear 55, 56 causes synchronous movements of the gripping jaw slides 40a, 40b; 41a, 41b. When the drive gear 55, 56 wheel rotates, the gripping jaw slides 40a, 40b; 41a, 41b are therefore moved synchronously towards or away from one another, the same applies to the gripping jaw slides 40a, 40b; 41a, 41b assigned to the two guides 35, 36.

The gripping jaw slides 40a, 40b of the first guide 35 can therefore be moved simultaneously or separately with respect to the gripping jaw slides 41a, 41b of the second guide 36, so that there is great flexibility with regard to the movement of the gripping jaw slides 40a, 40b; 41a, 41b. The gripping jaw slides 40a, 40b; 41a, 41b of the first or second guide 35, 36 can be moved synchronously, or only the gripping jaw slides 40a, 40b; 41a, 41b assigned to the first or second guide 35, 36 can be moved. In this way, it is possible to move the gripping jaws 20a, 20b fastened to the gripping jaw slides 40a, 40b; 41a, 41b parallel or already pivoted simultaneously without angular adjustment (by moving the gripping jaw slides 40a, 40b; 41a, 41b of both guides 35, 36 simultaneously), or, if only the gripping jaw slides 40a, 40b; 41a, 41b of one guide 35, 36 are moved, to pivot the gripping jaws 20a, 20b.

As already stated, the gripping jaws 20a, 20b are coupled to the gripping jaw guide arrangement 30. This coupling can be seen in FIG. 6b. In some aspects of the disclosure, the gripping jaws 20a, 20b are each connected via a rotary joint 26a, 43a; 26b, 43b to the gripping jaw slides 40a, 40b of the first guide 35 and are connected via a slot guide 27a, 25a, 44a; 27b, 25b, 44b to the gripping jaw slides 41a, 41b of the second guide 36. In some aspects of the disclosure, the rotary joint 26a, 43a; 26b, 43b can also be arranged in the gripping jaw slides 41a, 41b assigned to the second guide 36. In this case, in the combination shown, it is then necessary for the slot guides 27a, 25a, 44a; 27b, 25b, 44b to be arranged in the gripping jaw slides 40a, 40b assigned to the first guide 35.

However, it is not substantial to use the rotary joint/slot guide combination. Although the gripping jaws 20a, 20b must be held on the corresponding gripping jaw slide 40a, 40b; 41a, 41b in at least one guide 35, 36 by means of a rotary or pivoting joint, the use of a slot guide 27a, 25a, 44a; 27b, 25b, 44b is not absolutely necessary. For example, it is conceivable that in some aspects of the disclosure the gripping jaws 20a, 20b are moved with the gripping jaw slides 40a, 40b; 41a, 41b against a restoring (e.g., biasing) force, and when the gripping jaw slides 40a, 40b; 41a, 41b move back, the restoring force moves the gripping jaws 20a, 20b back.

Figure 7A:
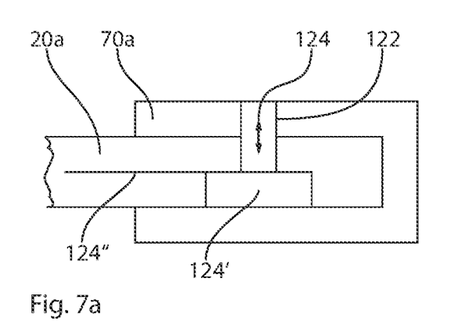
FIGS. 7a-7e are schematic views of different configurations of gripper and attachment couplers, according to aspects of the disclosure.

FIGS. 7a-7e schematically illustrate various options for the configuration of the combination of gripper couplers and attachment couplers. In aspects of the disclosure as shown in FIG. 7a, the gripper coupler 124 is designed as a vertically movable projection coupled to a drive 124', which in turn is connected via a line 124" to a control device (not shown). The corresponding attachment coupler 122 is designed as a simple recess in the transport attachment 70a. To release the interaction between the gripper coupler 124 and attachment coupler 122, the gripper coupler 124 (e.g., projection) is moved downward via the drive 124'. To restore the interaction, the gripper coupler 124 is extended upwards.

Figure 7B:
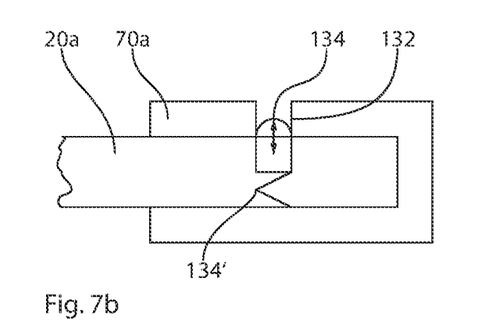

In aspects of the disclosure as shown in FIG. 7b, the gripper coupler 134 is also designed as a movable projection which, however, is urged by a spring 134' into an interactive position in which the transport attachment 70a is fastened to the gripping jaw 20a. The corresponding attachment coupler 132 is designed as a simple recess in the transport attachment 70a. By choosing a corresponding surface contour of the gripper coupler 134 (e.g., movable projection), the gripper coupler 134 is designed in such a way that when a corresponding force is applied, it is moved downward against the spring 134'. This force must of course be selected so that the transport attachment 70a only deliberately detaches from the gripping jaw 20a.

Figure 7C:
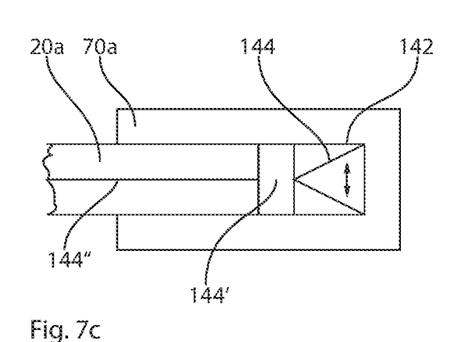

In aspects of the disclosure as shown in FIG. 7c, the gripper coupler 144 is designed as a chuck, the attachment coupler 142 is simply provided by the top and bottom of the transport attachment 70a. As the gripper coupler 144 (e.g., chuck) is opened, it is preloaded against the top and bottom of the transport attachment 70a, so that the transport attachment 70a is fixed on the gripping jaw 20a. In some aspects of the disclosure, the chuck 144 may engage in openings in the transport attachment 70a. The chuck 144 is actuated by a corresponding drive 144' which is coupled to a control device (not shown) via a line 144".

Figure 7D:
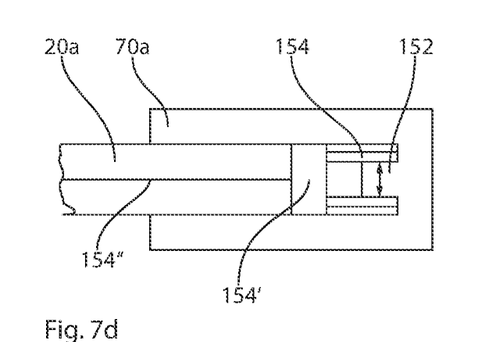

In aspects of the disclosure as shown in FIG. 7d, the gripper coupler 154 is designed as a gripper, which engages around an attachment coupler 152 designed as a projection or anchor for producing the interaction between the transport attachment 70a and the gripping jaw 20a. The gripper coupler 154 itself is movable via a drive 154', which in turn is coupled via a line 154" to a control device (not shown).

Figure 7E:
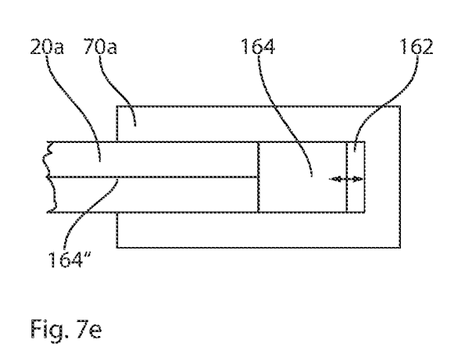

In aspects of the disclosure as shown in FIG. 7e, the interaction between the transport attachment 70a and the gripping jaw 20a is provided via a gripper coupler 164 designed as an electromagnet coupled via a line 164" to a control device (not shown). An attachment coupler 162 is designed as an at least partially ferromagnetic counter member.

Figure 8:
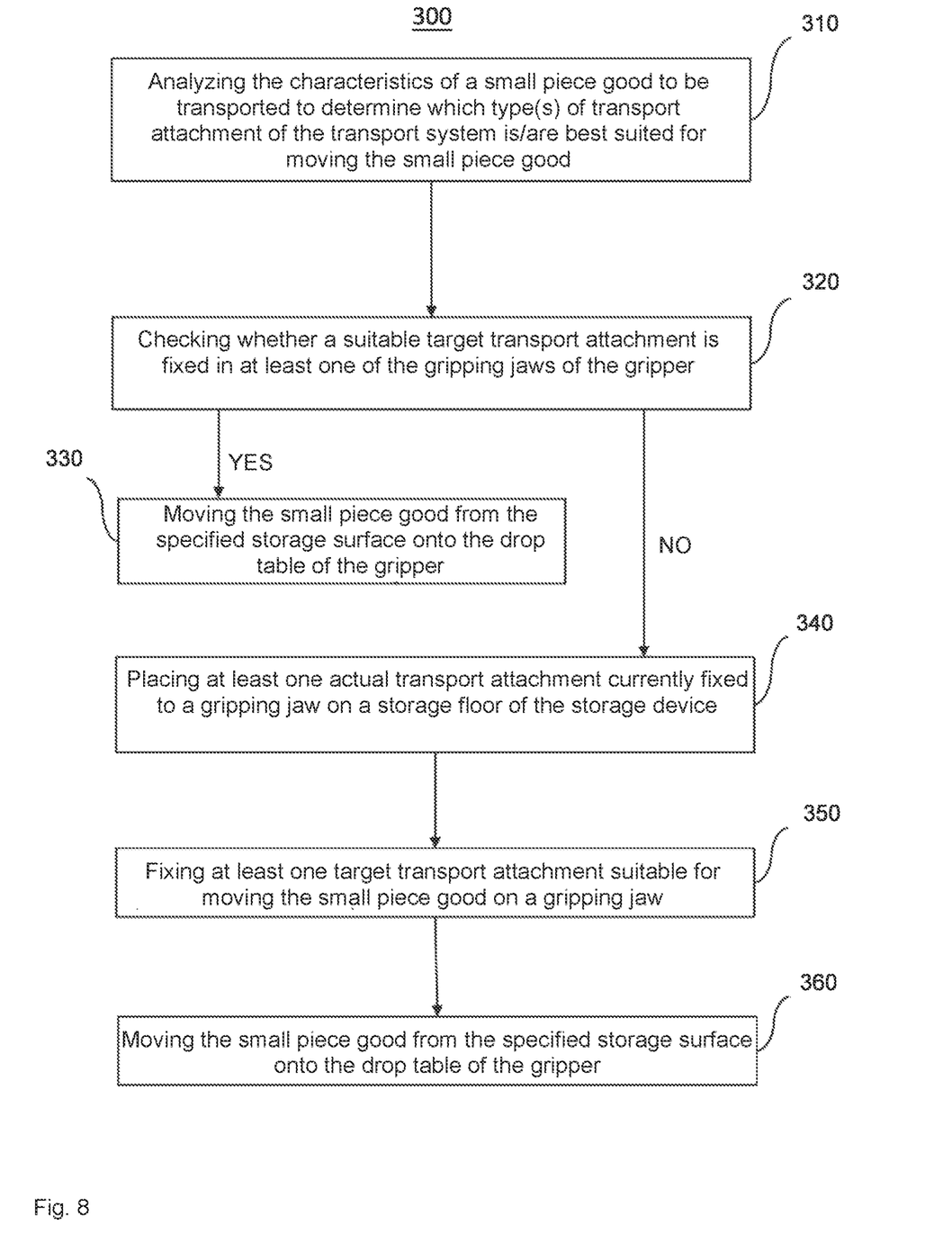
FIG. 8 is a flow chart of a method of operating a transport system, according to aspects of the disclosure.

FIG. 8 shows a flow chart of a method 300 according to some aspects of the disclosure. As soon as a small piece good, for example, is to be dispensed or if a small piece good is to be moved from a location of provision (e.g., a storage belt) to a storage surface (e.g., storage surface 5), in step 310, known characteristics of the small piece good to be transported are analyzed to determine which type(s) of the transport attachment(s) (e.g., transport attachments 70a, 70b) of the transport system (e.g., transport system 200) is/are best suited for moving the small piece good. If this is known, it is checked in step 320, whether a suitable target transport attachment is fixed in at least one of the gripping jaws (e.g., gripping jaws 20a, 20b) of the gripper (e.g., gripper 1). If this is the case, in step 330, the small piece good is moved from the storage surface to a drop table (e.g., drop table 10) of the gripper. If this is not the case, however, in a step 340, at least one actual transport attachment currently fixed to a gripping jaw is placed on a storage floor (e.g., storage floor 111) of a storage device (e.g., storage device 110), and in a following step 350, at least one target transport attachment suitable for moving the small piece good is fixed on a gripping jaw. For this purpose, the gripper is moved to the suitable transport attachment(s) and the interaction between couplers (e.g., gripper coupler 124, 134, 144, 154, 164 and attachment coupler 122, 132, 142, 152, 162) is established and a transport attachment is thus fixed on a gripping jaw. Then, in a step 360, the small piece good is moved from the specified storage surface onto the drop table of the gripper.

The present disclosure is provided to enable any person skilled in the art to practice the various aspects described herein. The disclosure provides various examples of the subject technology, and the subject technology is not limited to these examples. Various modifications to these aspects will be readily apparent to those skilled in the art, and the generic principles defined herein may be applied to other aspects.

A reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

The word "exemplary" or the term "for example" is used herein to mean "serving as an example or illustration." Any aspect or design described herein as "exemplary" or "for example" is not necessarily to be construed as preferred or advantageous over other aspects or designs. In one aspect, various alternative configurations and operations described herein may be considered to be at least equivalent.

As used herein, the phrase "at least one of" preceding a series of items, with the term "or" to separate any of the items, modifies the list as a whole, rather than each item of the list. The phrase "at least one of" does not require selection of at least one item; rather, the phrase allows a meaning that includes at least one of any one of the items, and/or at least one of any combination of the items, and/or at least one of each of the items. By way of example, the phrase "at least one of A, B, or C" may refer to: only A, only B, or only C; or any combination of A, B, and C.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

In one aspect, unless otherwise stated, all measurements, values, ratings, positions, magnitudes, sizes, and other specifications that are set forth in this specification, including in the claims that follow, are approximate, not exact. In one aspect, they are intended to have a reasonable range that is consistent with the functions to which they relate and with what is customary in the art to which they pertain.

It is understood that the specific order or hierarchy of steps, operations or processes disclosed is an illustration of exemplary approaches. Based upon design preferences, it is understood that the specific order or hierarchy of steps, operations or processes may be rearranged. Some of the steps, operations or processes may be performed simultaneously. Some or all of the steps, operations, or processes may be performed automatically, without the intervention of a user. The accompanying method claims, if any, present elements of the various steps, operations or processes in a sample order, and are not meant to be limited to the specific order or hierarchy presented.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112 (f) unless the element is expressly recited using the phrase "means for" or, in the case of a method claim, the element is recited using the phrase "step for." Furthermore, to the extent that the term "include," "have," or the like is used, such term is intended to be inclusive in a manner similar to the term "comprise" as "comprise" is interpreted when employed as a transitional word in a claim.

The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirement of 35 U.S.C. § 101, 102, or 103, nor should they be interpreted in such a way.

What is claimed is:

1. A gripper for a transport system of a picking device having horizontal storage surfaces for storing and dispensing small piece goods of different shapes and/or surface properties, the gripper comprising:
   a drop table extending in a first horizontal direction and a second horizontal direction orthogonal to the first horizontal direction, the drop table having at least one storage and dispensing end face;
   two elongated gripping jaws arranged above the drop table extending in the first horizontal direction and fastened to a gripping jaw guide arrangement, wherein at least one elongated gripping jaw is movable in the second horizontal direction, and wherein at least one elongated gripping jaw has a gripper coupler at an end portion opposite the gripping jaw guide arrangement; and
   at least one transport attachment with an attachment coupler, wherein the gripper coupler and the attachment coupler interact with one another so that a transport attachment is releasably fixed at the end portion of the at least one elongated gripping jaw with the gripper coupler.

2. The gripper of claim 1, wherein the gripper coupler comprises a projection that is retractable and extendable.

3. The gripper of claim 2, wherein the attachment coupler comprises a corresponding recess in the transport attachment.

4. The gripper of claim 2, wherein the projection is movable by a drive arranged in the gripper.

5. The gripper of claim 1, wherein the gripper coupler comprises a movable projection that is mechanically preloaded.

6. The gripper of claim 5, wherein the movable projection is configured to engage a recess of the attachment coupler without a counterforce.

7. The gripper of claim 1, wherein the gripper coupler comprises an electromagnet.

8. The gripper of claim 7, wherein the attachment coupler comprises a partially ferromagnetic counter member.

9. The gripper of claim 1, wherein the gripper coupler comprises a chuck.

10. The gripper of claim 9, wherein the attachment coupler comprises a corresponding receiving opening for the chuck.

11. The gripper of claim 1, wherein the gripper coupler comprises a damper.

12. The gripper of claim 11, wherein the attachment coupler comprises a corresponding anchor for the damper.

13. A transport system for a picking device for storing and dispensing small piece goods of various shapes or surface properties, the transport system comprising:
   a gripper comprising:
      a drop table extending in a first horizontal direction and a second horizontal direction orthogonal to the first horizontal direction, the drop table having at least one storage and dispensing end face;
      two elongated gripping jaws arranged above the drop table extending in the first horizontal direction and fastened to a gripping jaw guide arrangement, wherein at least one elongated gripping jaw is movable in the second horizontal direction, and wherein at least one elongated gripping jaw has a gripper coupler at an end portion opposite the gripping jaw guide arrangement; and
      at least one transport attachment with an attachment coupler, wherein the gripper coupler and the attachment coupler interact with one another so that a transport attachment is releasably fixed at the end portion of the at least one elongated gripping jaw with the gripper coupler;
   a plurality of transport attachments with different contact surfaces; and
   a storage device having a plurality of storage floors configured to receive the plurality of transport attachments.

14. The transport system of claim 13, wherein the storage device is configured to release an interaction between the gripper coupler and the attachment coupler.

15. The transport system of claim 13, wherein the gripper coupler comprises a projection that is retractable and extendable, and wherein the attachment coupler comprises a corresponding recess in the transport attachment.

16. The transport system of claim 15, wherein the projection is one of movable by a drive arranged in the gripper, and mechanically preloaded and configured to engage a recess of the attachment coupler without a counterforce.

17. The transport system of claim 13, wherein the gripper coupler comprises an electromagnet, and wherein the attachment coupler comprises a partially ferromagnetic counter member.

18. The transport system of claim 13, wherein the gripper coupler comprises a chuck, and wherein the attachment coupler comprises a corresponding receiving opening for the chuck.

19. The transport system of claim 13, wherein the gripper coupler comprises a clamper, and wherein the attachment coupler comprises a corresponding anchor for the damper.

20. A method for operating a transport system, the method comprising:
- analyzing characteristics of a small piece good to be transported;
- determining which type of transport attachment of a plurality of transport attachments with different contact surfaces to use for moving the small piece good;
- selecting the determined transport attachment;
- checking whether the selected transport attachment is fixed in at least one of two elongated gripping jaws of a gripper comprising:
  - a drop table extending in a first horizontal direction and a second horizontal direction orthogonal to the first horizontal direction, the drop table having at least one storage and dispensing end face;
  - the two elongated gripping jaws arranged above the drop table extending in the first horizontal direction and fastened to a gripping jaw guide arrangement, wherein at least one elongated gripping jaw is movable in the second horizontal direction, and wherein at least one elongated gripping jaw has a gripper coupler at an end portion opposite the gripping jaw guide arrangement; and
  - at least one transport attachment with an attachment coupler, wherein the gripper coupler and the attachment coupler interact with one another so that a transport attachment is releasably fixed at the end portion of the at least one elongated gripping jaw with the gripper coupler; and
- when the selected transport attachment is determined not to be fixed in at least one of the gripping jaws of the gripper:
  - placing a transport attachment currently fixed to a first gripping jaw on a storage floor of a storage device having a plurality of storage floors configured to receive the plurality of transport attachments;
  - retrieving the selected transport attachment from the storage device; and
  - fixing the selected transport attachment on the first gripping jaw.

* * * * *

UNITED STATES PATENT AND TRADEMARK OFFICE
CERTIFICATE OF CORRECTION

| | |
|---|---|
| PATENT NO. | : 11,912,511 B2 |
| APPLICATION NO. | : 17/116721 |
| DATED | : February 27, 2024 |
| INVENTOR(S) | : Dietmar Gross, Stephan Brokonier and Heinrich Paul Martini |

It is certified that error appears in the above-identified patent and that said Letters Patent is hereby corrected as shown below:

In the Claims

Claim 11, Column 14, Line 27, delete "damper" and insert --clamper--
Claim 12, Column 14, Line 29, delete "damper" and insert --clamper--
Claim 19, Column 15, Line 11, delete "damper" and insert --clamper--

Signed and Sealed this
Twenty-sixth Day of March, 2024

Katherine Kelly Vidal
*Director of the United States Patent and Trademark Office*